United States Patent
Jung

(10) Patent No.: US 12,249,720 B2
(45) Date of Patent: Mar. 11, 2025

(54) ELECTRODE ASSEMBLY HAVING ENHANCED SAFETY AND LITHIUM SECONDARY BATTERY COMPRISING SAME

(71) Applicant: LG Energy Solution, Ltd., Seoul (KR)

(72) Inventor: Hye Ran Jung, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 527 days.

(21) Appl. No.: 17/633,452

(22) PCT Filed: May 3, 2021

(86) PCT No.: PCT/KR2021/005538
§ 371 (c)(1),
(2) Date: Feb. 7, 2022

(87) PCT Pub. No.: WO2021/230547
PCT Pub. Date: Nov. 18, 2021

(65) Prior Publication Data
US 2022/0285694 A1   Sep. 8, 2022

(30) Foreign Application Priority Data

May 14, 2020  (KR) .......................... 10-2020-0057619
Apr. 30, 2021  (KR) .......................... 10-2021-0056840

(51) Int. Cl.
H01M 4/76   (2006.01)
H01M 4/02   (2006.01)
(Continued)

(52) U.S. Cl.
CPC ...... *H01M 4/762* (2013.01); *H01M 2004/021* (2013.01); *H01M 2004/027* (2013.01);
(Continued)

(58) Field of Classification Search
CPC ..................................................... H01M 4/472
See application file for complete search history.

(56) References Cited

U.S. PATENT DOCUMENTS 9,252,451  B2 *  2/2016  Kwon ............... H01M 10/0436
2021/0090818  A1 *  3/2021  Aita ....................... H01G 11/66

FOREIGN PATENT DOCUMENTS

CN        103427091 A   12/2013
CN        106469825 A    3/2017
(Continued)

OTHER PUBLICATIONS

Machine translation of KR101850180B1 (no date) (Year: 0000).*
(Continued)

*Primary Examiner* — Amanda C. Walke
(74) *Attorney, Agent, or Firm* — MORGAN, LEWIS & BOCKIUS LLP

(57) ABSTRACT

An electrode assembly of the present invention comprises a cathode active material layer, a cathode current collector, a separator, an anode current collector, and an anode active material layer, which are stacked in order, wherein the current collectors have a plurality of through-holes formed to allow communication between the upper surface and the lower surface of the current collector. The electrode assembly of the present invention has the effect of preventing a rapid temperature increase if an internal short caused by damage to the separator occurs.

11 Claims, 6 Drawing Sheets

(51) Int. Cl.
*H01M 4/04* (2006.01)
*H01M 10/052* (2010.01)

(52) U.S. Cl.
CPC .... *H01M 2004/028* (2013.01); *H01M 4/0473* (2013.01); *H01M 10/052* (2013.01)

(56) References Cited

FOREIGN PATENT DOCUMENTS

| | | | | |
|---|---|---|---|---|
| CN | 110112421 A | 8/2019 | | |
| EP | 2605322 A1 | 6/2013 | | |
| EP | 2605322 A2 * | 6/2013 | ........ | H01M 10/0436 |
| EP | 2605322 B1 | 11/2017 | | |
| JP | 2010-232404 A | 10/2010 | | |
| JP | 2013-182810 A | 9/2013 | | |
| JP | 2016-058258 A | 4/2016 | | |
| JP | 2016-126896 A | 7/2016 | | |
| JP | WO2017/130574 A1 | 8/2017 | | |
| JP | 2019-186202 A | 10/2019 | | |
| KR | 10-1998-0022275 A | 7/1998 | | |
| KR | 10-0328681 B1 | 11/2002 | | |
| KR | 10-2012-0131558 A | 12/2012 | | |
| KR | 10-2013-0044776 A | 5/2013 | | |
| KR | 20130112310 A * | 10/2013 | | |
| KR | 10-1493569 B1 | 2/2015 | | |
| KR | 2016-0089656 A | 7/2016 | | |
| KR | 10-1741412 B1 | 5/2017 | | |
| KR | 10-2018-0036858 A | 4/2018 | | |
| KR | 10-1850180 B1 | 4/2018 | | |
| KR | 10-2018-0107859 A | 10/2018 | | |
| KR | 10-2019-0001461 A | 1/2019 | | |
| KR | 10-1968640 B1 | 4/2019 | | |
| WO | 2018/062851 A1 | 4/2018 | | |
| WO | WO-2019039332 A1 * | 2/2019 | ............. | C22C 38/00 |
| WO | WO-2019088795 A2 * | 5/2019 | .......... | H01M 10/052 |

OTHER PUBLICATIONS

Office Action issued Sep. 15, 2023, by the Chinese Patent Office in corresponding Chinese Patent Application No. 202180004702.5.
International Search Report issued in corresponding International Patent Application No. PCT/KR2021/005538 dated Aug. 6, 2021.
Extended European Search Report issued in corresponding European Patent Application No. 21803178.9 dated Sep. 9, 2022.

* cited by examiner

[FIG. 1]
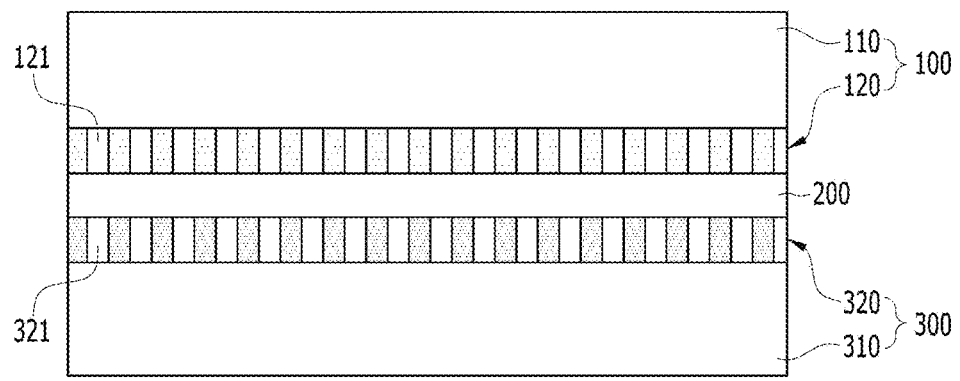

[FIG. 2]
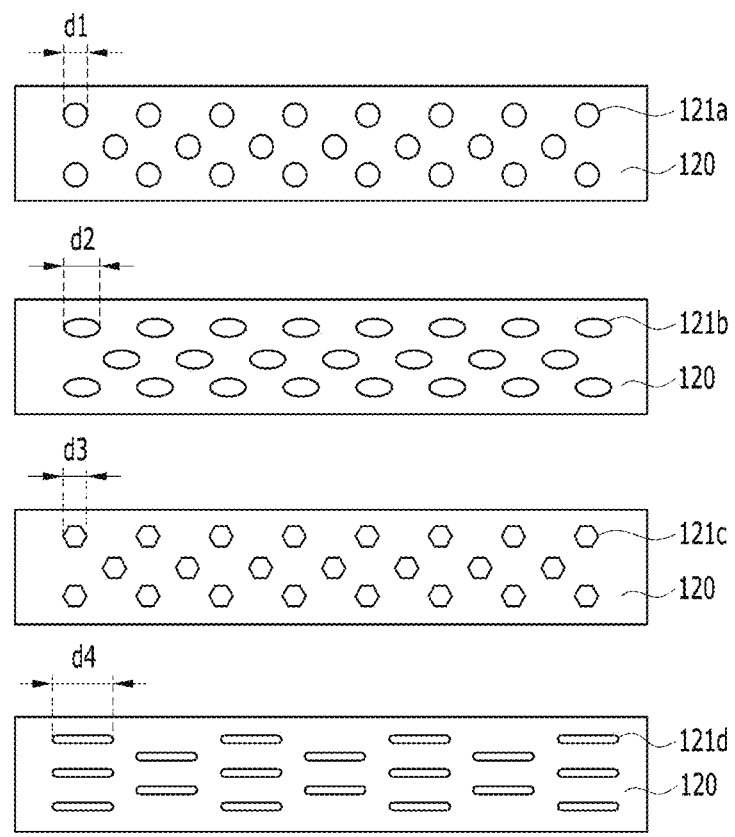

[FIG. 3]
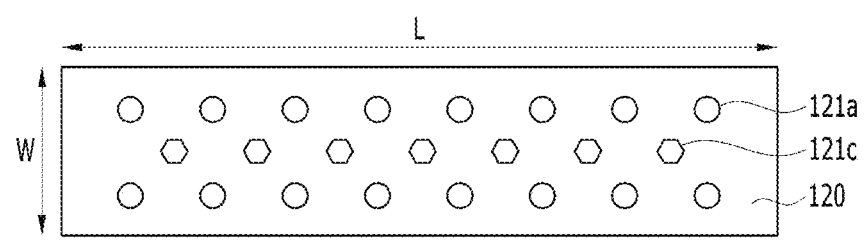
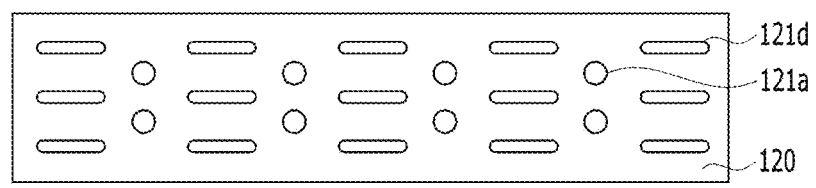

[FIG. 4]
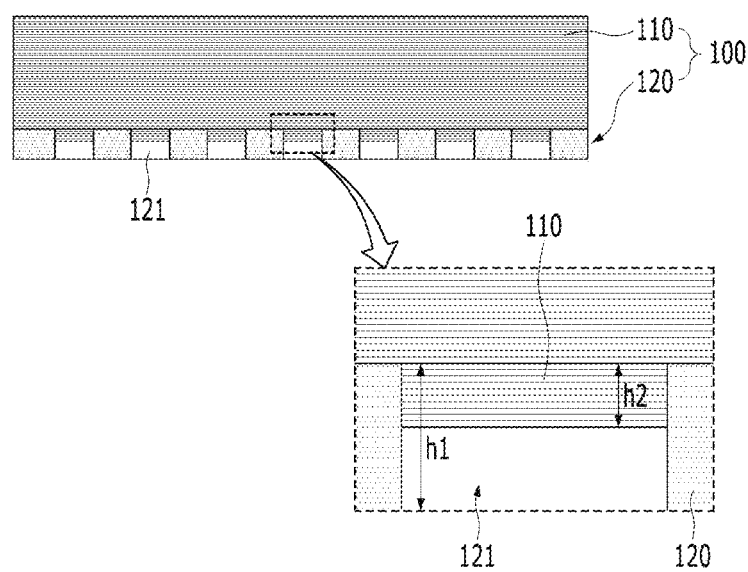

[FIG. 5]
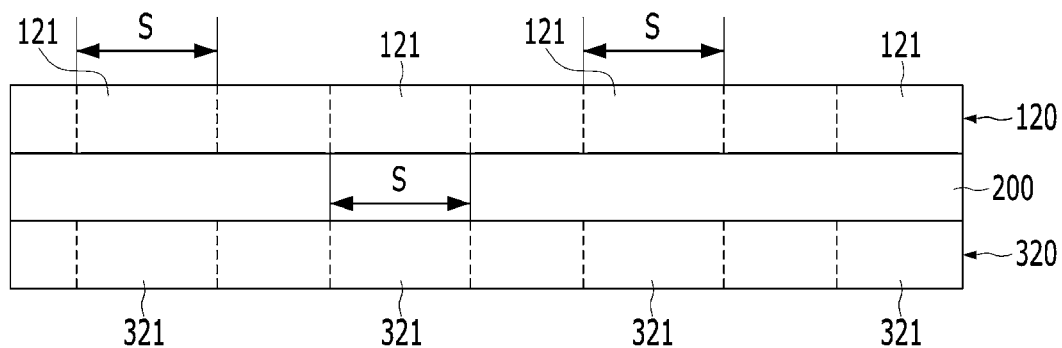

[FIG. 6]
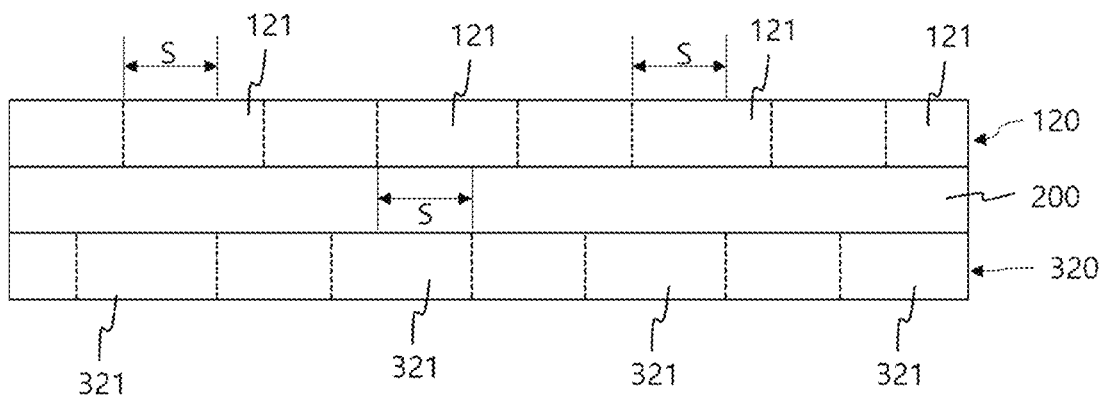

ELECTRODE ASSEMBLY HAVING ENHANCED SAFETY AND LITHIUM SECONDARY BATTERY COMPRISING SAME

TECHNICAL FIELD

This application claims the benefit of priority based on Korean Patent Application No. 10-2020-0057619 filed on May 14, 2020 and Korean Patent Application No. 10-2021-0056840 filed on Apr. 30, 2021, and the content of these Korean Patent Applications are incorporated herein as part of the present specification.

The present invention relates to an electrode assembly of a new structure for preventing thermal runaway, and a lithium secondary battery including the same.

BACKGROUND ART

As technologies for mobile devices are developed and demand for the mobile devices increases, there has been a rapid increase in demand for secondary batteries as energy sources. Among such secondary batteries, lithium secondary batteries, which exhibit a high energy density and operational potential, a long cycle life, and a low self-discharge rate have been commercialized and widely used.

Among such secondary batteries, in terms of the shape of the battery, there is a high demand for a prismatic secondary battery and a pouch-type secondary battery that can be applied to products such as mobile phones with a small thickness. In terms of materials, there is a high demand for lithium secondary batteries such as lithium ion batteries and lithium polymer batteries having high energy density, discharge voltage, and output stability.

Generally, secondary batteries are formed as follows. First, an electrode assembly, which is formed of a negative electrode, a positive electrode, and a separator interposed between the negative electrode and the positive electrode, is prepared, and the electrode assembly is laminated or wound, which is then built in a battery case of a laminate sheet, into which an electrolyte solution is injected or impregnated, to thereby prepare secondary batteries.

One of the major research tasks in these secondary batteries is to improve safety. For example, secondary batteries may be exploded due to a high temperature or a high pressure inside the batteries, which may be caused by abnormal operating states of batteries such as a fall, a deformation by external shock, an exposure to high temperatures, an overcharged state exceeding an allowed current and voltage, and an internal short circuit.

In particular, the space in the negative electrode, into which surplus lithium ions desorbed from the positive electrode may become insufficient due to repeated charge/discharge and overcharge, thereby allowing lithium ions to be precipitated on the surface of the negative electrode as metal. Further, as metal impurities, which are mixed in the process of manufacturing batteries, are recrystallized, they may pass through the separator and directly contact the positive electrode, which may lead to an internal short circuit. Further, the tearing or folding of the separator may also cause an internal short circuit. These issues lead to safety problems. As such, alternatives to solve these problems are being reviewed.

DISCLOSURE

Technical Problem

The present invention has been created to solve the above problems, and an object of the present invention is to provide a lithium secondary battery and an electrode assembly capable of preventing a rapid temperature rise when an internal short circuit occurs as the separator is torn or folded.

Technical Solution

An electrode assembly of the present invention for achieving the above object is generated by lamination in an order of a positive electrode active material layer/positive electrode current collector/separator/negative electrode current collector/a negative electrode active material layer, wherein a plurality of through holes, which are connected to an upper surface and a lower surface of the current collectors, are perforated in the current collectors.

In an embodiment of the present invention, each thickness of the positive electrode current collector and the negative electrode current collector is in a range of 10 to 50 micrometers.

In an embodiment of the present invention, a total sum of areas of the through holes corresponds to 15 to 80% of a surface area of the upper surface or the lower surface of the current collector.

In an embodiment of the present invention, the through holes are formed of one or more of circular, elliptical, polygon and slit shapes.

In an embodiment of the present invention, a diameter of the circular through hole or a long diameter of the elliptical through hole or the polygon through hole is in a range of 0.1 mm to 5 mm, and a length of the slit-shaped through hole is in a range of 1 mm to 10 mm.

In an embodiment of the present invention, a total area of through holes formed on the negative electrode current collector is relatively greater than a total area of through holes formed on the positive electrode current collector.

In an embodiment of the present invention, the total area of through holes formed on the negative electrode current collector corresponds to 101% to 200% of the total area of through holes formed on the positive electrode current collector.

In the electrode assembly according to an embodiment of the present invention, a part of a positive electrode mixture of the positive electrode active material layer or a negative electrode mixture of the negative electrode active material layer is filled in a part of an inside of the through hole. At this time, a depth, by which the positive electrode mixture or the negative electrode mixture is filled in the through hole, corresponds to 1% to 50% of the thickness of the current collector.

In the electrode assembly according to an embodiment of the present invention, through holes formed on the positive electrode current collector and the negative electrode current collector are arranged to be mutually overlapped.

Herein, the through holes formed on the positive electrode current collector and the through holes formed on the negative electrode current collector may be mutually overlapped by 20 to 100%, preferably 40 to 100% of a ratio of an area which overlaps with the through hole formed on the negative electrode current collector in the total area of the through hole formed on the positive electrode current collector.

A lithium secondary battery according to the present invention includes the electrode assembly.

Advantageous Effects

In an electrode assembly according to the present invention, a separator, which is interposed between a positive electrode and a negative electrode, directly faces a positive electrode current collector and a negative electrode current collector. As such, even when an internal short circuit occurs by the tearing or folding of the separator, the positive electrode current collector and the negative electrode current collector, which are made of a metal material, contact each other to be electrically connected, which prevents a rapid rise of the temperature of batteries due to the characteristics of the material, thereby improving safety.

BRIEF DESCRIPTION OF THE DRAWINGS

FIG. 1 is a cross-sectional view of an electrode assembly according to the present invention.

FIG. 2 is a planar schematic diagram showing current collectors having various types of through holes formed thereon according to an embodiment of the present invention.

FIG. 3 is a planar schematic diagram showing current collectors having through holes, formed of two or more different shapes, formed thereon according to another embodiment of the present invention.

FIG. 4 is a cross-sectional view of an electrode of a structure in which a part of an electrode mixture is filled in through holes of a current collector.

FIG. 5 is a cross-sectional schematic diagram illustrating an arrangement form of through holes respectively formed in a positive electrode current collector and a negative electrode current collector according to an embodiment of the present invention.

FIG. 6 is a cross-sectional schematic diagram illustrating an arrangement form of through holes respectively formed in a positive electrode current collector and a negative electrode current collector according to another embodiment of the present invention.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

FIG. 1 is a cross-sectional view of an electrode assembly according to an embodiment of the present invention.

Referring to FIG. 1, an electrode assembly of the present invention is generated by lamination in an order of a positive electrode active material layer 110/positive electrode current collector 120/separator 200/negative electrode current collector 320/a negative electrode active material layer 310, and a plurality of through holes 121 and 321, which are connected to an upper surface and a lower surface of the current collectors, are perforated in the current collectors 120 and 320.

A general electrode assembly is generated by lamination in an order of a positive electrode current collector/a positive electrode active material layer/a separator/a negative electrode active material layer/a negative electrode current collector, in which the positive electrode active material layer faces one surface of the separator, and the negative electrode active material layer faces another surface of the separator. However, the separator may be torn or folded due to the problem of the manufacturing process of the batteries, and when such a separator is interposed between a positive electrode and a negative electrode, the positive electrode directly contacts the negative electrode during the operation of the batteries, which makes the positive electrode be electrically connected to the negative electrode. This causes a rapid temperature rise due to the resistance, thereby increasing a danger.

In an electrode assembly of the present invention, a positive electrode current collector faces one surface of a separator, and a negative electrode current collector faces another surface of the separator. As such, even if the positive electrode faces the negative electrode by the tearing or folding of the separator, the positive electrode current collector faces the negative electrode current collector, which lowers a danger because the temperature does not rapidly rises as the current collectors made of a metal having very high electrical conductivity and thermal conductivity. Further, a plurality of through holes, which are connected to the upper surface and the lower surface, are perforated on the positive electrode current collector and the negative electrode current collector so that lithium ions may move between the positive electrode and the negative electrode.

In secondary batteries according to the present invention, current collectors having through holes formed thereon may be made of any metal having conductivity while not causing chemical changes to the batteries. For example, the current collectors may be made of a metal selected from the group consisting of aluminum, aluminum alloy, nickel, copper, stainless steel, nickel, titanium, and calcined carbon, or an alloy foil thereof, preferably aluminum foil or copper foil.

In a specific example, the thickness of each of the positive electrode current collector and the negative electrode current collector may be in a range of 10 to 100 micrometers, preferably 10 to 50 micrometers, more preferably 15 to 30 micrometers.

When the thickness of the current collectors is smaller than 10 micrometers, it is difficult to increase the amount of active materials by a desired amount, and when it is greater than 100 micrometers, the thickness of the entire electrode increases, thereby reducing the amount of the electrode mixture applied, which is not preferable.

In a specific example, any structure consisting of one or more units including a positive electrode, a negative electrode and a separator from a battery case without performance deterioration of battery cells may be used as the electrode assembly. Specifically, some examples thereof include a jelly-roll type electrode assembly, which is formed by sequentially laminating a positive electrode plate, a separator and a negative electrode plate and winding them, a stack-type electrode assembly, which is formed by laminating one or more positive electrode plates and one or more negative electrode plates while a separator is interposed therebetween, a stack-folding type electrode assembly, which is formed as stack type unit cells including a positive electrode plate and a negative electrode plate are wound on a separate sheet, and a lamination-stack type electrode assembly, which is formed as stack type unit cells including a positive electrode plate and a negative electrode plate are stacked while a separator is interposed therebetween.

FIG. 2 schematically illustrates through holes formed in a current collector as an embodiment of the present invention.

Referring to FIG. 2, through holes 121 formed on current collectors 120 are formed of circular through holes 121a, elliptical through holes 121b, polygon through holes 121c or slit-shaped through holes 121d, and through holes formed on one of the current collectors are formed of the same shape.

The shape of the through holes is set to be the same for convenience of the manufacturing process.

Meanwhile, the total sum of areas of the through holes may be selected within a range in which the strength is not too weakened according to the thickness of the current collector or the material of the current collector and may correspond to 10 to 90%, preferably 15 to 80%, and more preferably 20 to 60% of the surface area of the upper surface or lower surface of the current collector.

When the total sum of the areas of the through holes corresponds to less than 10% of the upper surface or the lower surface of the current collector, it is difficult to achieve the electrical performance of the battery such as a desired capacity as the moving passage is narrowed, and conversely, when the total sum corresponds to more than 90% thereof, the strength of the current collector may be weakened.

In addition, the size of the through holes $121a$, $121b$, $121c$ and $121d$ may be selected from an appropriate range considering the area and thickness of the current collector, and the capacity of the battery. The diameter d1 of the circular through hole $121a$ or the long diameter d2 of the elliptical through hole $121b$ or the long diameter d3 of the polygon through hole $121c$ may be in a range of 0.1 mm to 5 mm, specifically 0.5 mm to 4 mm, and more specifically 1 mm to 3 mm. Further, the length d4 of the slit-shaped through hole $121d$ may be in a range of 1 mm to 10 mm, specifically 2 mm to 8 mm, and more specifically 4 mm to 7 mm.

When the size of the through holes is too small, it is difficult to increase the utilization rate of the active materials by movement of lithium ions, and when the size of the through holes is too large, the strength of the current collector may be weakened.

In another specific example, two or more through holes are perforated on the current collectors, and the through holes may be formed of two or more different shapes. For example, circular through holes, elliptical through holes or polygon through holes may be positioned at up, down, right, left or diagonal sides on the straight line of the slit-shaped through holes, and conversely, slit-shaped through holes may be positioned at up, down, right, left or diagonal sides on the straight line of circular through holes, elliptical through holes or polygon through holes. When such shapes are used, it is possible to increase the amount of the active materials filled in the through holes and prevent strength deterioration of the current collector.

FIG. 3 schematically shows a current collector having through holes formed in two or more different shapes.

Referring to FIG. 3, through holes formed of circular through holes $121a$ and polygon through holes $121c$ of two or more different shapes are formed on a current collector 210. The circular through holes $121a$ and polygon through holes $121c$ are formed at regular intervals in a longitudinal direction L of the current collector 120, and through holes of different shapes are positioned not be to overlapped on the cross section in the width direction W or the cross section in the longitudinal direction.

Lines formed of circular through holes $121a$ and lines formed of polygon through holes $121c$ are alternately formed on the current collector 120.

As another example, through holes formed of slit-shaped through holes $121d$ and circular through holes $121a$ of two or more different shapes are formed on current collectors 120. The slit-shaped through holes $121d$ and circular through holes $121a$ are formed at regular intervals in a longitudinal direction L of the current collector 120, and through holes of different shapes are positioned not be to overlapped on the cross section in the width direction W or the cross section in the longitudinal direction of the current collector 120. Likewise, by allowing through holes of different shapes to be positioned on different lines, it is possible to increase the capacity of batteries and prevent deterioration of the strength of the current collector.

FIGS. 5 and 6 illustrate an arrangement form of through holes respectively formed in a positive electrode current collector and a negative electrode current collector according to various embodiments of the present invention. Referring to FIGS. 5 and 6, through holes 121, which are formed on a positive electrode current collector 120, and through holes 321, which are formed on a negative electrode current collector 320, are arranged to be mutually overlapped. Referring to these figures, the through holes formed on the positive electrode current collector have regions S which overlap with through holes 321 formed on its corresponding negative electrode current collector, and lithium ions may move between the positive electrode and the negative electrode through the through holes of the overlapping regions S.

FIG. 5 illustrates an embodiment in which through holes of a positive electrode current collector and through holes of its corresponding negative electrode current collector are mutually overlapped by 100%. FIG. 6 illustrates an embodiment in which through holes of a positive electrode current collector and through holes of its corresponding negative electrode current collector are arranged less than 100% overlapped.

Herein, the degree, to which through holes of the positive electrode current collector and through holes of its corresponding negative electrode current collector are mutually overlapped, may correspond to a ratio of the area which overlaps with the through holes of its corresponding negative electrode current collector of 20 to 100%, preferably 40 to 100%, and more preferably 70 to 100%, or ideally close to 100%, in the through holes of the positive electrode current collector. The ratio of the area where the through holes of the positive electrode current collector overlap with the through holes of its corresponding negative electrode current collector may be calculated as follows. First, a positive electrode and a negative electrode are peeled off from the electrode assembly prepared according to the present invention, which is then cut in a certain size to thereby prepare specimen. Thereafter, 10 through holes are selected among through holes formed in the positive electrode current collector, and the area (H) of the positive electrode current collector through hole is measured for each of the selected through holes. Thereafter, the area (h) of the portion where the positive electrode current collector through holes overlaps with the negative electrode current collector through holes is measured. Therefore, the percentage ratios of h/H are calculated, which are then averaged.

In the present invention, as the degree, by which the through holes of the positive electrode current collector overlap with the through holes of the negative electrode current collector, gets smaller, the positive electrode current collector may directly contact the negative electrode mixture layer filled in the through holes of the negative electrode current collector, or the negative electrode current collector may directly contact the positive electrode mixture layer filled in the through holes of the positive electrode current collector, whereby they may be electrically connected, which is not desirable in terms of safety. Further, since the cross-sectional area of the moving path of the lithium ions is reduced, it is not desirable in terms of the battery performance. Therefore, in the present invention, through holes of a positive electrode current collector and through holes of its corresponding negative electrode current collector are preferably arranged to be almost overlapped.

The electrode constituting the electrode assembly according to the present invention may have a shape where an electrode active material layer including an electrode active material is applied on a current collector having through holes formed thereon. The electrode active material layer may be formed of an electrode mixture including a binder and a conductive material as well as an electrode active material, and when necessary, a filler may be further added to the mixture.

The positive electrode of the present invention includes a positive electrode active material layer formed on the positive electrode current collector.

Any positive electrode active material usable in the related technical field may be used as the positive electrode active material contained in the positive electrode active material layer of the present invention. Some examples of the positive electrode active materials include: a lithium metal; lithium cobalt-based oxide such as $LiCoO_2$; lithium manganese-based oxide such as $Li_{1+x}Mn_{2-x}O_4$ (herein, x is 0 to 0.33), $LiMnO_3$, $LiMn_2O_3$, and $LiMnO_2$; lithium copper oxide such as $Li_2CuO_2$; vanadium oxide such as $LiV_3O_8$; lithium nickel-based oxide expressed as $LiNi_{1-x}M_xO_2$ (herein, M=Co, Mn, Al, Cu, Fe, Mg, B or Ga, and x=0.01 to 0.3); lithium manganese composite oxide expressed as $LiMn_{2-x}M_xO_2$ (herein, M=Co, Ni, Fe, Cr, Zn or Ta, x=0.01 to 0.1) or $Li_2Mn_3MO_8$ (herein, M=Fe, Co, Ni, Cu or Zn); lithium-nickel-manganese-cobalt-based oxide expressed as $Li(Ni_aCo_bMn_c)O_2$ (herein, $0<a<1$, $0<b<1$, $0<c<1$, a+b+c=1); a sulfur or disulfide compound; and phosphate such as $LiFePO_4$, $LiMnPO_4$, $LiCoPO_4$ and $LiNiPO_4$; and $Fe_2(MoO_4)_3$, but the present invention is not limited to these examples.

The negative electrode of the present invention includes a negative electrode active material layer formed on the negative electrode current collector.

Materials known in the related technical field may be used as the negative electrode active material contained in the negative electrode active material layer of the present invention. Some examples of the materials include carbons such as natural graphite, artificial graphite, inflatable graphite, carbon fiber, non-graphitizable carbon, carbon black, carbon nanotube, fullerene, activated carbon and graphite materials; a metal, which may be alloyed with lithium, such as Al, Si, Sn, Ag, Bi, Mg, Zn, In, Ge, Pb, Pd, Pt and Ti; a compound containing Al, Si, Sn, Ag, Bi, Mg, Zn, In, Ge, Pb, Pd, P and Ti; a metal such as Al, Si, Sn, Ag, Bi, Mg, Zn, In, Ge, Pb, Pd, P or Ti, its compound, and a carbon composite; and lithium-containing nitride, but the present invention is not limited to these examples.

The binder is added in an amount of 1 to 30% by weight, on the basis of the total weight of the electrode mixture containing an electrode active material, as a component that assists in bonding between the active material and the conductive material and bonding to the current collector. Examples of such binders include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene monomer (EPDM), sulfonated EPDM, styrene butylene rubber, fluorine rubber, various copolymers thereof and the like.

The conductive material is usually added in an amount of 1 to 30% by weight based on the total weight of the mixture including the positive electrode active material. Such a conductive material is not particularly limited as long as it has electrical conductivity without causing a chemical change in the battery, and examples thereof include graphite such as natural graphite and artificial graphite; carbon black such as carbon black, acetylene black, Ketjen black, channel black, furnace black, lamp black, and summer black; conductive fibers such as carbon fiber and metal fiber; metal powders such as carbon fluoride, aluminum and nickel powder; conductive whiskey such as zinc oxide and potassium titanate; conductive metal oxides such as titanium oxide; and conductive materials such as polyphenylene derivatives and the like.

The filler is optionally used as a component for inhibiting expansion of an electrode, and is not particularly limited as long as it is a fibrous material without causing a chemical change in the battery. Examples of the filler include olefin polymers such as polyethylene and polypropylene; fibrous materials such as glass fibers and carbon fibers.

In one specific example, a part of a positive electrode mixture of the positive electrode active material layer or a negative electrode mixture of the negative electrode active material layer may be filled in a part of the through hole.

FIG. 4 is a cross-sectional view of an electrode of a structure in which an electrode mixture is filled in a part of through holes. Referring to FIG. 4, a part of the positive electrode mixture constituting the positive electrode active material layer 110 is filled in the through holes 121 formed on the positive electrode current collector 120. The positive electrode mixture is applied on the current collector having through holes, which is then dried and rolled. In the rolling process, a part of the positive electrode mixture contained in the positive electrode active material layer may fill a part of the through holes by pressing force. Likewise, when the mixture of the electrode active material layer is filled in a part of the through holes, the ion conductivity of the lithium ions may be improved, which is desirable in terms of electric characteristics of the battery.

At this time, the depth h2, by which the positive electrode active material layer or the negative electrode active material layer is filled in the through holes, may correspond to 1 to 50% of the thickness h1 of the current collector, specifically 5 to 40%, and more specifically 10 to 30%. When the thickness, by which the mixture was filled in the active material layer, is too large, the positive electrode active material layer may directly contact the negative electrode active material layer when the separator is damaged, which is not desirable.

Meanwhile, in a lithium secondary battery, the efficiency of a negative electrode active material may be relatively lower than that of a positive electrode active material. Even if the theoretical capacity of the negative electrode active material is the same as that of the positive electrode active material, irreversible capacity is generated in the negative electrode active material during the initial charge/discharge, and thus the operating efficiency of the negative electrode active material becomes lower than that of the positive electrode active material. Hence, it is preferable that the thickness of the negative electrode mixture layer is formed to be greater than that of the positive electrode mixture layer. Likewise, since it is necessary to further increase the capacity of the negative electrode compared to the that of the positive electrode, the total area of through holes formed on the negative electrode current collector may be formed to be greater than the total area of through holes formed on the positive electrode current collector. Specifically, the total area of through holes formed on the negative electrode current collector may correspond to 101 to 200%, specifically 105 to 170%, and more specifically 110 to 150% of the total area of through holes formed on the positive electrode current collector.

If the total area of through holes formed on the negative electrode current collector corresponds to less than 101% of the total area of through holes formed on the positive electrode current collector, the positive electrode may be unnecessarily wasted due to the negative electrode having a relatively low operating efficiency, and if the total area of through holes formed on the negative electrode current collector corresponds to more than 200% of the total area of through holes formed on the positive electrode current collector, the current collector of the negative electrode may be manufactured to be weak, and the negative electrode may be wasted as it is not balanced with the operating efficiency of the positive electrode.

The present invention provides a secondary battery in which the electrode assembly is sealed in a battery case together with an electrolyte.

The electrolyte may include, but is not limited to, a non-aqueous organic solvent containing a lithium salt, an organic solid electrolyte, an inorganic solid electrolyte, and the like.

Some examples of the non-aqueous organic solvent may include n-methyl-2-pyrrolidone, propylene carbonate, ethylene carbonate, butylene carbonate, dimethylcarbonate, diethyl carbonate, ethyl methyl carbonate, gamma-butyllactone, 1,2-dimethoxyethane, 1,2-diethoxyethane, tetrahydroxy furan, 2-methyltetrahydrofuran, dimethylsulfoxide, 1,3-dioxolane, 4-methyl-1,3-dioxene, diethyl ether, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ether, propionate methyl, and propionic acid ethyl.

The lithium salt is a material which may be easily dissolved in the non-aqueous electrolyte. Some examples of the lithium salt may include LiCl, LiBr, LiI, LiClO$_4$, LiBF$_4$, LiB$_{10}$Cl$_{10}$, LiPF$_6$, LiAsF$_6$, LiSbF$_6$, LiAlCl$_4$, LiSCN, LiC$_4$BO$_8$, LiCF$_3$CO$_2$, LiCH$_3$SO$_3$, LiCF$_3$SO$_3$, LiN(SO$_2$CF$_3$)$_2$, LiN(SO$_2$C$_2$F$_5$)$_2$, LiC$_4$F$_9$SO$_3$, LiC(CF$_3$SO$_2$)$_3$, (CF$_3$SO$_2$)·2NLi, chloro boran lithium, low aliphatic carboxylic acid lithium, and 4 phenyl boric acid lithium imide.

Examples of the organic solid electrolyte include a polymer electrolyte such as a polyethylene derivative, a polyethylene oxide derivative, a polypropylene oxide derivative, a phosphate ester polymer, an agitation lysine, a polyester sulfide, a polyvinyl alcohol, a polyvinylidene fluoride, a polymer including an ionic dissociation group, and the like.

Examples of the inorganic solid electrolyte include nitrides, halides, and sulfates of Li such as Li$_3$N, LiI, Li$_5$NI$_2$, Li$_3$N-LiT-LiOH, LiSiO$_4$, LiSiO$_4$-LiT-LiOH, Li$_2$SiS$_3$, Li$_4$SiO$_4$, Li$_4$SiO$_4$—LiI—LiOH, and Li$_3$PO$_4$—Li$_2$S—SiS$_2$.

Further, the electrolyte may further contain other additives for improvement of charging and discharging characteristics and flame retardancy. Some examples of the additive include pyridine, triethylphosphite, triethanolamine, cyclic ether, ethylene diamine, n-glyme, hexa phosphate triemide, nitrobenzene derivatives, sulfur, quinone imine dye, N-substituted oxazolidinone, N, N-substituted imidazolidine, ethylene glycol dialkyl ether, ammonium salts, pyrrol, 2-methoxy ethanol, aluminum trichloride, fluoroethylene carbonate (FEC), propenesultone (PRS), and vinylene carbonate (VC).

The secondary battery may be used as a battery cell used as a power source of a small device and may also be used as a unit battery for a battery pack including a plurality of battery cells used as a power source of a medium-large device requiring high temperature safety, log cycle characteristics and high rate characteristics, etc., and a medium-large device including the battery pack as its power source.

Preferred examples of the medium-sized device include a power tool that moves by receiving power from a battery module, a mobile device, and a wearable device; an electric vehicle such as an electric vehicle (EV), a hybrid electric vehicle (HEV), or a plug-in hybrid electric vehicle (PHEV); an electric two-wheeled vehicle such as an e-bike or an e-scooter; an electric golf cart; and a power storage system, but the present invention is not limited to these examples.

Hereinafter, preferred examples are presented to provide a desired embodiment, but the following examples are illustrative of the present invention, and various changes and modifications within the scope of the present invention are obvious to those skilled in the art, and it is natural that those changes and modifications belong to the scope of the appended claims.

Example 1

A positive electrode was manufactured by using LCO (LiCoO$_2$) as the positive electrode active material. LCO, Super-P and PVDF were mixed at the weight ratio of LCO:Super-P:PVDF=95:2.5:2.5 while using N-Methyl Pyrrolidone (NMP) as a solvent, to thereby prepare a slurry, which was then coated on an aluminum foil of a thickness of 20 μm, to thereby manufacture a positive electrode of a thickness of 70 μm. At this time, a plurality of circular through holes (diameter of 1 mm) are formed in the aluminum foil, and the total sum of the surface areas of the circular through holes corresponds to 50% of the upper surface area of the aluminum foil.

A negative electrode was manufactured using artificial graphite as the negative electrode active material. Artificial graphite, Super-P and PVDF were mixed at the weight ratio of artificial graphite:Super-P:PVDF=95:2.5:2.5 while using N-Methyl Pyrrolidone (NMP) as a solvent, to thereby prepare a slurry, which was then coated on an copper foil of a thickness of 20 μm, to thereby manufacture a negative electrode of a thickness of 70 μm. At this time, a plurality of circular through holes (diameter of 1 mm) are formed in the copper foil, and the total sum of the surface areas of the circular through holes corresponds to 60% of the upper surface area of the copper foil.

Thereafter, a separator was interposed between the positive electrode and the negative electrode so that lamination may be performed in the order of a positive electrode active material layer/an aluminum foil layer/a separator/a copper foil layer/a negative electrode active material layer. At this time, the separator is made of polyethylene having a thickness of 20 μm, and square through holes having a 10 mm width and a 10 mm length are formed on a portion of the separator. Further, the ratio, by which through holes formed on the aluminum foil layer overlap with through holes formed on the copper foil, was set to be 100%.

Thereafter, an electrolyte solution containing 1.0M LiPF$_6$ as a lithium salt and vinylene carbonate (VC) of 2 weight % as an additive was injected into a solvent consisting of ethylene carbonate (EC):diethyl carbonate (DEC):dimethyl carbonate (DMC)=1:2:1 (v/v), to thereby manufacture a lithium secondary battery.

Example 2

A lithium secondary battery was manufactured in the same manner as in example 1 except that the ratio, by which through holes formed on the aluminum foil overlap with through holes formed on the copper foil, was adjusted to 80% in example 1.

Example 3

A lithium secondary battery was manufactured in the same manner as in example 1 except that the ratio, by which through holes formed on the aluminum foil overlap with through holes formed on the copper foil, was adjusted to 65% in example 1.

Example 4

A lithium secondary battery was manufactured in the same manner as in example 1 except that the ratio, by which through holes formed on the aluminum foil overlap with through holes formed on the copper foil, was adjusted to 50% in example 1.

Comparative Example

A positive electrode was manufactured by using LCO (LiCoO$_2$) as the positive electrode active material. LCO, Super-P and PVDF were mixed at the weight ratio of LCO:Super-P:PVDF=95:2.5:2.5 while using N-Methyl Pyrrolidone (NMP) as a solvent, to thereby prepare a slurry, which was then coated on an aluminum foil of a thickness of 20 μm, to thereby manufacture a positive electrode of a thickness of 70 μm.

A negative electrode was manufactured using artificial graphite as the negative electrode active material. Artificial graphite, Super-P and PVDF were mixed at the weight ratio of artificial graphite:Super-P:PVDF=95:2.5:2.5 while using N-Methyl Pyrrolidone (NMP) as a solvent, to thereby prepare a slurry, which was then coated on an copper foil of a thickness of 20 μm, to thereby manufacture a negative electrode of a thickness of 70 μm.

Thereafter, a separator was interposed between the positive electrode and the negative electrode so that lamination may be performed in the order of an aluminum foil layer/a positive electrode active material layer/a separator/a negative electrode active material layer/a copper foil. At this time, the separator is made of polyethylene having a thickness of 20 μm, and square through holes having a 10 mm width and a 10 mm length are formed on a portion of the separator. Lithium secondary batteries were then prepared in the same manner as in the above Example.

Experimental Example: Temperature Measurement

After full-charging the batteries of examples 1 to 4 and a comparative example, the batteries were pressed by the pressure of 1 MPa for about 30 minutes. Further, by measuring the temperature of the batteries while pressing the batteries, the maximum temperature rises are shown in Table 1.

TABLE 1

|  | Example 1 | Example 2 | Example 3 | Example 4 | Comparative example |
|---|---|---|---|---|---|
| Maximum temperature rise (° C.) | 32.1 | 43.2 | 50.5 | 57.0 | 65.2 |

As shown in the above Table 1, a temperature rise in a secondary battery including an electrode assembly at the time of an internal short circuit according to an example of the present invention was smaller than a temperature rise in a secondary battery including an electrode assembly having a conventional structure according to a comparative example. Therefore, according to an electrode assembly and a lithium secondary battery of the present invention, a rapid temperature rise may be prevented when an internal short circuit occurs, thereby enhancing safety.

The invention claimed is:

1. An electrode assembly comprising a positive electrode active material layer, a positive electrode current collector, a separator, a negative electrode current collector, and a negative electrode active material layer sequentially stacked in an order listed,
    wherein the positive and negative current collectors include a plurality of through holes, and each of the through holes perforates through the positive and negative current collectors from an upper surface to a lower surface of the positive and negative current collectors,
    wherein a part of a positive electrode mixture of the positive electrode active material layer or a negative electrode mixture of the negative electrode active material layer is filled in a part of an inside of the through hole, and
    wherein a thickness of the positive electrode mixture or the negative electrode mixture in the through hole is 1% to 50% of a thickness of the current collector.

2. The electrode assembly of claim 1, wherein each thickness of the positive electrode current collector and the negative electrode current collector is in a range of 10 to 50 micrometers.

3. The electrode assembly of claim 1, wherein a total area of the through holes on the upper surface or the lower surface of the positive and negative current collectors is 15 to 80% of a surface area of the upper surface or the lower surface of the current collector.

4. The electrode assembly of claim 1, wherein shapes of the through holes on the upper surface or the lower surface of the positive and negative current collectors are circular, elliptical, polygon or slit shapes.

5. The electrode assembly of claim 4, wherein a diameter of the circular, a long diameter of the elliptical or the polygon is in a range of 0.1 mm to 5 mm, and a length of the slit shapes is in a range of 1 mm to 10 mm.

6. The electrode assembly of claim 1, wherein a total area of the through holes formed on the negative electrode current collector is greater than a total area of through holes on the positive electrode current collector.

7. The electrode assembly of claim 6, wherein the total area of through holes formed on the negative electrode current collector is 101% to 200% of the total area of through holes formed on the positive electrode current collector.

8. The electrode assembly of claim 1, wherein the through holes formed on the positive electrode current collector and the negative electrode current collector are arranged to be mutually overlapped.

9. The electrode assembly of claim 8, wherein the through holes formed on the positive electrode current collector and the through holes formed on the negative electrode current collector are mutually overlapped by 20 to 100% of area of the through holes formed on the negative electrode current collector and the positive electrode current collector.

10. The electrode assembly of claim 8, wherein the through holes formed on the positive electrode current collector and the through holes formed on the negative electrode current collector are mutually overlapped by 40 to 100% of a ratio of an area which overlaps with the through hole formed on the negative electrode current collector in a total area of the through hole formed on the positive electrode current collector.

11. A lithium secondary battery comprising the electrode assembly according to claim 1.

\* \* \* \* \*